United States Patent
Ohno et al.

(10) Patent No.: US 8,172,921 B2
(45) Date of Patent: May 8, 2012

(54) HONEYCOMB STRUCTURE

(75) Inventors: Kazushige Ohno, Ibi-gun (JP);
Masafumi Kunieda, Ibi-gun (JP);
Shigeharu Ishikawa, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 495 days.

(21) Appl. No.: 11/954,840

(22) Filed: Dec. 12, 2007

(65) Prior Publication Data
US 2008/0202087 A1    Aug. 28, 2008

(30) Foreign Application Priority Data

Feb. 28, 2007 (JP) .................................. 2007/53770

(51) Int. Cl.
*B01D 39/20* (2006.01)
(52) U.S. Cl. ............. 55/523; 60/311; 422/177; 428/116
(58) Field of Classification Search ...................... 55/483, 55/484, 523–525; 422/177; 60/311; 428/116–118; 502/527.19–527.22
See application file for complete search history.

(56) References Cited

U.S. PATENT DOCUMENTS

| | | | | |
|---|---|---|---|---|
| 5,098,763 | A | * | 3/1992 | Horikawa et al. ............. 428/116 |
| 5,629,067 | A | * | 5/1997 | Kotani et al. .................. 428/116 |
| 5,686,039 | A | * | 11/1997 | Merry ............................ 264/259 |
| 5,914,187 | A | | 6/1999 | Naruse et al. |
| 6,109,386 | A | | 8/2000 | Maus et al. |
| 6,669,751 | B1 | | 12/2003 | Ohno et al. |
| 7,112,233 | B2 | | 9/2006 | Ohno et al. |
| 7,309,370 | B2 | | 12/2007 | Kudo et al. |
| 7,727,613 | B2 | * | 6/2010 | Suwabe et al. ................. 428/116 |
| 2004/0045267 | A1 | * | 3/2004 | Ichikawa et al. ................ 55/523 |
| 2004/0055265 | A1 | * | 3/2004 | Ohno et al. ..................... 55/523 |
| 2004/0108056 | A1 | | 6/2004 | Fujita et al. |
| 2004/0128991 | A1 | | 7/2004 | Sakamoto |
| 2004/0161596 | A1 | | 8/2004 | Taoka et al. |
| 2004/0194908 | A1 | | 10/2004 | Tomohide |
| 2005/0025933 | A1 | | 2/2005 | Masukawa et al. |
| 2005/0109023 | A1 | | 5/2005 | Kudo et al. |
| 2005/0153099 | A1 | | 7/2005 | Yamada |
| 2005/0160710 | A1 | | 7/2005 | Taoka et al. |
| 2005/0161849 | A1 | | 7/2005 | Ohno et al. |

(Continued)

FOREIGN PATENT DOCUMENTS

EP    353056    1/1990

(Continued)

*Primary Examiner* — Duane Smith
*Assistant Examiner* — Thomas McKenzie
(74) *Attorney, Agent, or Firm* — Ditthavong Mori & Steiner, P.C.

(57) ABSTRACT

A honeycomb structure is provided that includes a plurality of pillar-shaped honeycomb fired bodies, each having a number of cells longitudinally disposed in parallel with one another with a cell wall therebetween. An adhesive layer is interposed between adjacent honeycomb fired bodies of the plurality of honeycomb fired bodies to combine the plurality of honeycomb fired bodies together, and a sealing material layer is formed on an outer peripheral face of the combined plurality of honeycomb fired bodies. At least two honeycomb fired bodies of the plurality of honeycomb fired bodies have an outer wall that forms a portion of the outer peripheral face of the combined plurality of honeycomb fired bodies. At least one of the outer walls has a protruding portion extending from a surface thereof, and the protruding portion is made from a same material as a material of the at least one outer wall.

20 Claims, 10 Drawing Sheets

U.S. PATENT DOCUMENTS

| | | | |
|---|---|---|---|
| 2005/0169819 A1 | 8/2005 | Shibata | |
| 2005/0175514 A1 | 8/2005 | Ohno | |
| 2005/0178098 A1 | 8/2005 | Ono et al. | |
| 2005/0180898 A1 | 8/2005 | Yamada | |
| 2005/0229565 A1* | 10/2005 | Yoshida | 55/523 |
| 2005/0247038 A1 | 11/2005 | Takahashi | |
| 2005/0272602 A1 | 12/2005 | Ninomiya | |
| 2006/0021310 A1* | 2/2006 | Ohno et al. | 55/523 |
| 2006/0051556 A1 | 3/2006 | Ohno et al. | |
| 2006/0166820 A1 | 7/2006 | Ogyu et al. | |
| 2006/0177629 A1 | 8/2006 | Kunieda | |
| 2006/0191245 A1* | 8/2006 | Bardon | 55/523 |
| 2006/0210765 A1 | 9/2006 | Ohno et al. | |
| 2006/0213163 A1 | 9/2006 | Taoka et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0228521 A1 | 10/2006 | Ohno et al. | |
| 2006/0230732 A1 | 10/2006 | Kunieda | |
| 2006/0254231 A1 | 11/2006 | Hayashi et al. | |
| 2007/0004592 A1 | 1/2007 | Ohno et al. | |
| 2007/0020155 A1 | 1/2007 | Ohno et al. | |
| 2007/0028575 A1 | 2/2007 | Ohno et al. | |
| 2007/0044444 A1 | 3/2007 | Oshimi | |
| 2007/0065348 A1 | 3/2007 | Ohno et al. | |
| 2007/0068128 A1 | 3/2007 | Oshimi et al. | |
| 2007/0116908 A1 | 5/2007 | Ohno et al. | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0169453 A1 | 7/2007 | Hayakawa | |
| 2007/0178275 A1 | 8/2007 | Takahashi | |
| 2007/0190289 A1 | 8/2007 | Fujita | |
| 2007/0190350 A1 | 8/2007 | Ohno et al. | |
| 2007/0196620 A1 | 8/2007 | Ohno et al. | |
| 2007/0204580 A1 | 9/2007 | Kunieda | |
| 2007/0212517 A1 | 9/2007 | Ohno et al. | |
| 2007/0293392 A1 | 12/2007 | Ohno et al. | |
| 2008/0202086 A1 | 8/2008 | Ohno et al. | |
| 2008/0202087 A1 | 8/2008 | Ohno et al. | |
| 2008/0203626 A1 | 8/2008 | Ohno et al. | |
| 2008/0236394 A1 | 10/2008 | Ohno et al. | |
| 2008/0237941 A1 | 10/2008 | Ohno et al. | |
| 2008/0241501 A1 | 10/2008 | Ohno et al. | |
| 2008/0286523 A1 | 11/2008 | Ohno et al. | |

FOREIGN PATENT DOCUMENTS

| | | |
|---|---|---|
| EP | 1623750 | 2/2006 |
| JP | 2001-511065 | 8/2001 |
| JP | 2001-329836 | 11/2001 |
| JP | 2003-227327 | 8/2003 |
| JP | 2004-154718 | 6/2004 |
| JP | 2004-251518 | 9/2004 |
| WO | WO 03/031371 | 4/2003 |
| WO | WO 2005/009614 | 2/2005 |
| WO | WO 2005/099865 | 10/2005 |
| WO | WO 2006/137151 | 12/2006 |

* cited by examiner

A-A line cross sectional view

US 8,172,921 B2

HONEYCOMB STRUCTURE

CROSS-REFERENCE TO RELATED APPLICATIONS

The present application claims priority under 35 U.S.C. §119 to PCT Application No. PCT/JP2007/053770, filed Feb. 28, 2007, the contents of which are incorporated herein by reference in their entirety.

BACKGROUND OF THE INVENTION

1. Field of the Invention

The present invention relates to structures for purifying or converting gases, and methods of manufacturing such structures.

2. Discussion of the Background

In recent years, particulates such as soot contained in exhaust gases discharged from internal combustion engines of vehicles such as buses and trucks, and construction machines have raised serious problems as contaminants harmful to the environment and the human body. For this reason, various honeycomb filters, which use a honeycomb structure made of porous ceramics, have been proposed as filters that collect particulates in exhaust gases and purify the exhaust gases.

FIG. 7 is a perspective view that schematically shows one example of a honeycomb structure, FIG. 8(a) is a perspective view that schematically shows a honeycomb fired body forming the honeycomb structure, and FIG. 8(b) is an A-A line cross-sectional view of FIG. 8(a).

In a honeycomb structure 250, as shown in FIG. 7, a plurality of honeycomb fired bodies 240 are combined with one another by interposing an adhesive layer 254 to form a ceramic block 255, and a sealing material layer 253 is further formed on a peripheral face 256 of the ceramic block 255. Moreover, as shown in FIGS. 8(a) and 8(b), each honeycomb fired body 240 has a structure in which a large number of cells 241 are disposed in parallel with one another in the longitudinal direction (the direction shown by an arrow B in FIG. 8(a)), and a cell wall 242 between the cells 241 is allowed to function as a filter. That is, as shown in FIG. 8(b), the ends of either the exhaust gas inlet side or the exhaust gas outlet side of each of the cells 241 formed in the honeycomb fired body 240 is sealed with a plug 246 so that the exhaust gas entering one cell 241 is discharged from another cell 241 after having always passed through a cell wall 242 between the cells 241; thus, when exhaust gas passes through the cell wall 242, particulates are captured by the cell wall 242, so that the exhaust gas is purified.

Here, upon manufacturing a honeycomb structure having the above shape, after a plurality of rectangular pillar-shaped honeycomb fired bodies have been combined with one another to form a rectangular pillar-shaped honeycomb aggregated body having a larger size, a process for cutting the periphery thereof is needed so as to shape the honeycomb aggregated body into a ceramic block having a round pillar shape, with the result that a problem arises in which cut portions generated during this cutting process cause wasteful materials.

In order to solve this problem, Japanese Unexamined Patent Application Publication No. 2004-154718 A (hereinafter referred to as JP2004-154718A) describes a honeycomb filter having a structure that is free from wasteful materials due to cutting processes upon manufacturing. That is, the honeycomb filter described in JP2004-154718A is manufactured by combining a plurality of kinds of honeycomb fired bodies having different shapes by interposing an adhesive layer, without the necessity of the cutting process; thus, the structure of the honeycomb filter is designed in such a manner so as to prevent generation of wasteful materials. The contents of JP2004-154718A are incorporated herein by reference in their entirety.

FIGS. 9(a) to 9(c) show honeycomb fired bodies that form a round pillar-shaped honeycomb filter described in JP2004-154718A. Moreover, FIG. 10 shows a ceramic block formed by combining the honeycomb fired bodies shown in FIGS. 9(a) to 9(c).

The honeycomb filter described in JP2004-154718A is manufactured by using processes in which a plurality of honeycomb fired bodies 220, honeycomb fired bodies 230 and honeycomb fired bodies 240, as shown in FIGS. 9(a) to 9(c), are combined with one another by interposing an adhesive layer 214 to form a ceramic block 215 (see FIG. 10).

The honeycomb fired bodies 220, 230 and 240, shown in FIGS. 9(a) to 9(c), respectively, have a large number of cells 221, 231 and 241, and outer walls 223, 233 and 243 are formed on the peripheral portions of the large number of cells. Thus, the peripheral face 216 of the ceramic block 215 manufactured by using the honeycomb fired bodies having the outer walls on the peripheral portions of the cells is formed into a flat curved face without any step difference (see FIG. 10).

A sealing material layer may be formed on the periphery of the peripheral face 216 of the ceramic block 215 so as to prevent exhaust gases from leaking from the peripheral portion of the honeycomb structure. However, in the case where the sealing material layer is formed on the ceramic block 215, a problem arises in which the sealing material layer is separated from the ceramic block after it has been used as a filter for purifying exhaust gases for a long period of time.

SUMMARY OF THE INVENTION

A honeycomb structure is provided that includes a plurality of pillar-shaped honeycomb fired bodies, each having a number of cells longitudinally disposed in parallel with one another with a cell wall therebetween. An adhesive layer is interposed between adjacent honeycomb fired bodies of the plurality of honeycomb fired bodies to combine the plurality of honeycomb fired bodies together, and a sealing material layer is formed on an outer peripheral face of the combined plurality of honeycomb fired bodies. At least two honeycomb fired bodies of the plurality of honeycomb fired bodies have an outer wall that forms a portion of the outer peripheral face of the combined plurality of honeycomb fired bodies. At least one of the outer walls has a protruding portion extending from a surface thereof, and the protruding portion is made from a same material as a material of the at least one outer wall.

The honeycomb structure can include an outer wall that has one or more protruding portions formed thereon, where a number of the protruding portions formed on the outer wall is smaller than a number of cell walls connected to the outer wall of a corresponding honeycomb fired body.

The honeycomb structure can be configured where, out of a total number of the honeycomb fired bodies having outer walls that form a portion of the outer peripheral face of the combined plurality of honeycomb fired bodies, four or more of the total number each have a protruding portion extending from a surface of a respective outer wall thereof.

The honeycomb structure can be configured where, out of all of the honeycomb fired bodies having outer walls that form a portion of the outer peripheral face of the combined plurality of honeycomb fired bodies, each outer wall of the honeycomb fired bodies having a cross-sectional shape, taken along a plane perpendicular to a longitudinal direction thereof, that is defined by two straight lines and one curved line has a protruding portion extending from a surface thereof.

The honeycomb structure can be configured where, out of all of the honeycomb fired bodies having outer walls that form a portion of the outer peripheral face of the combined plurality of honeycomb fired bodies, each outer wall of the honeycomb fired bodies having a cross-sectional shape, taken along a plane perpendicular to a longitudinal direction thereof, that is defined by three straight lines and one curved line has a protruding portion extending from a surface thereof.

The honeycomb structure can include a shape of the protruding portion that is an approximately triangular pillar shape, an approximately semi-round pillar shape, or an approximately rectangular parallelepiped shape that extends parallel to a longitudinal direction of a respective honeycomb fired body thereof.

The honeycomb structure can include a shape of the protruding portion is an approximately rectangular parallelepiped shape that extends parallel to a longitudinal direction of a respective honeycomb fired body thereof, where both of a width and a height of a cross-sectional shape of the protruding portion, taken along a plane perpendicular to the longitudinal direction, are about 0.5 to about 2 mm. The honeycomb structure can be configured where a proportion of a longitudinal length of the protruding portion to a longitudinal length of the respective honeycomb structure thereof is about 70 to about 100%. The honeycomb structure can be configured where the protruding portion continuously extends on the surface of the at least one outer wall from one end face of the respective honeycomb fired body to another end face of the respective honeycomb fired body in the longitudinal direction. The honeycomb structure can be configured where the protruding portion is a plurality of portions disconnected between one end face of the respective honeycomb fired body and another end face of the respective honeycomb fired body in the longitudinal direction.

The honeycomb structure can be configured where the protruding portion is provided in a center portion of the surface of the at least one outer wall of a respective honeycomb fired body thereof.

The honeycomb structure can be configured where the protruding portion has a roughened surface in comparison with the surface of the at least one outer wall.

The honeycomb structure can be configured where each of the cells has an approximately square shape with a substantially common dimension, where the cells are positioned with a substantially common interval therebetween in a cross section perpendicular to a longitudinal direction of the cells, and where a location of the cells is limited to a place in which the approximately square shape does not overlap with a position of the outer wall of a respective honeycomb fired body.

The honeycomb structure can be configured where each of the cells has one of an approximately triangular shape and an approximately square shape in a cross section perpendicular to a longitudinal direction of the cells, where the cells having the approximately triangular shape are provided along the outer wall of a respective honeycomb fired body, and where the cells having an approximately square shape are provided inward of the cells having the approximately triangular shape toward a center of the combined plurality of honeycomb fired bodies.

The honeycomb structure can be configured where each of the cells has one of an approximately triangular shape, an approximately square shape and an approximately trapezoidal shape in a cross section perpendicular to a longitudinal direction of the cells, where the cells having one of the approximately triangular and the approximately trapezoidal shape are provided along the outer wall of a respective honeycomb fired body, and where the cells having the approximately square shape are provided inward of the cells having one of the approximately triangular shape and the approximately trapezoidal shape toward a center of the combined plurality of honeycomb fired bodies.

The honeycomb structure can be configured where a thickness of at least one of the cell wall and the outer wall is from about 0.20 to about 0.40 mm.

The honeycomb structure can be configured where a thickness of the outer wall is thicker than a thickness of the cell wall.

The honeycomb structure can be configured where a thickness of the sealing material layer is from about 0.5 to about 2.5 mm and is larger than a thickness of the protruding portion.

The honeycomb structure can be configured where each of the cells has either one end or another end thereof that is sealed.

The honeycomb structure can be configured where both ends of the cells are not sealed.

The honeycomb structure can be configured where the honeycomb structure is configured as a honeycomb filter for use in purifying exhaust gases.

The honeycomb structure can be configured where the honeycomb structure is configured as a catalyst supporting carrier.

BRIEF DESCRIPTIONS OF THE DRAWINGS

A more complete appreciation of the invention and many of the attendant advantages thereof will be readily obtained as the same becomes better understood by reference to the following detailed description when considered in connection with the accompanying drawings.

FIGS. 4($a$) and 4($b$) are perspective views that show examples of a B-type honeycomb fired body having a protruding portion on the surface of an outer wall, out of B-type honeycomb fired bodies forming the honeycomb structure according to an embodiment of the present invention.

Figure 3:
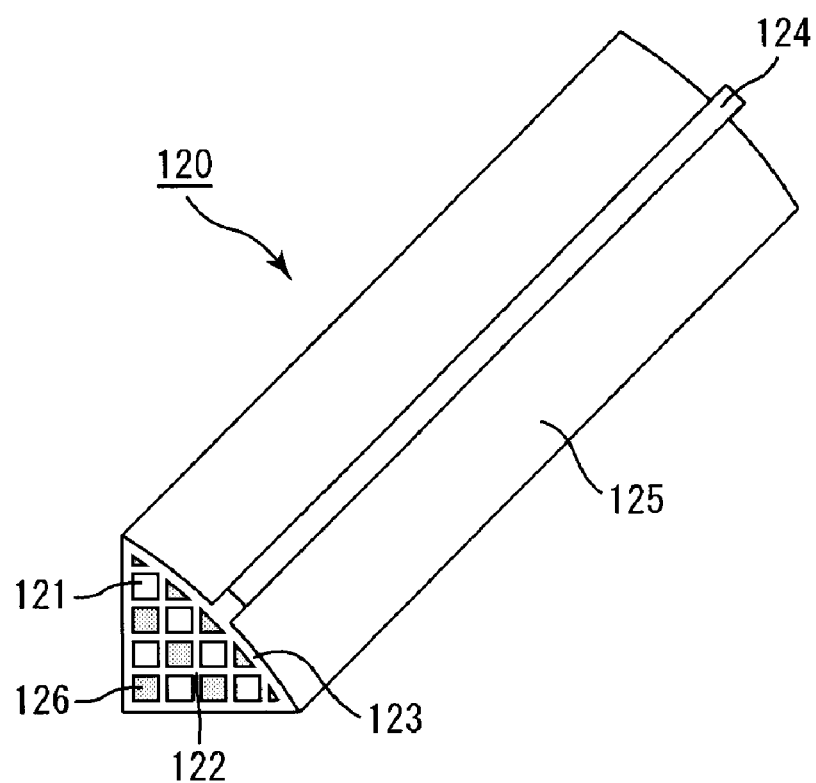
FIG. 3 is a perspective view that shows another example of the embodiment in which an A-type honeycomb fired body has a protruding portion thereon.
Figure 5:
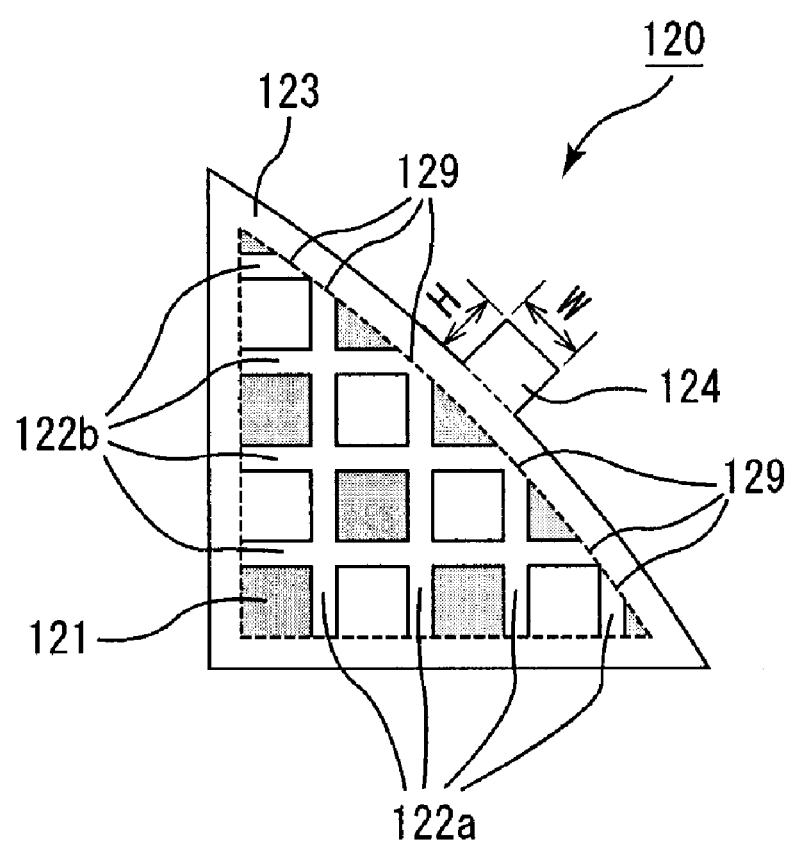

FIG. 5 is a cross-sectional view obtained by cutting the A-type honeycomb fired body shown in FIG. 3 by a cross section perpendicular to the longitudinal direction thereof.

FIGS. 6($a$) and 6($b$) are perspective views that schematically show other examples of the embodiment in which the A-type honeycomb fired body has a protruding portion thereon.

Figure 7:
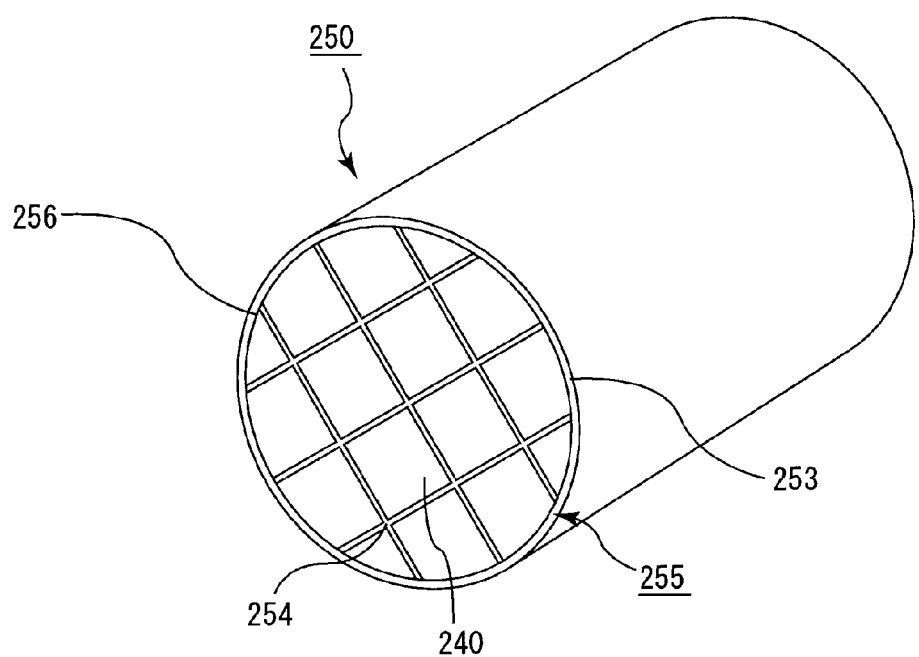

FIG. 7 is a perspective view that schematically shows a conventional honeycomb structure.

Figure 8A:
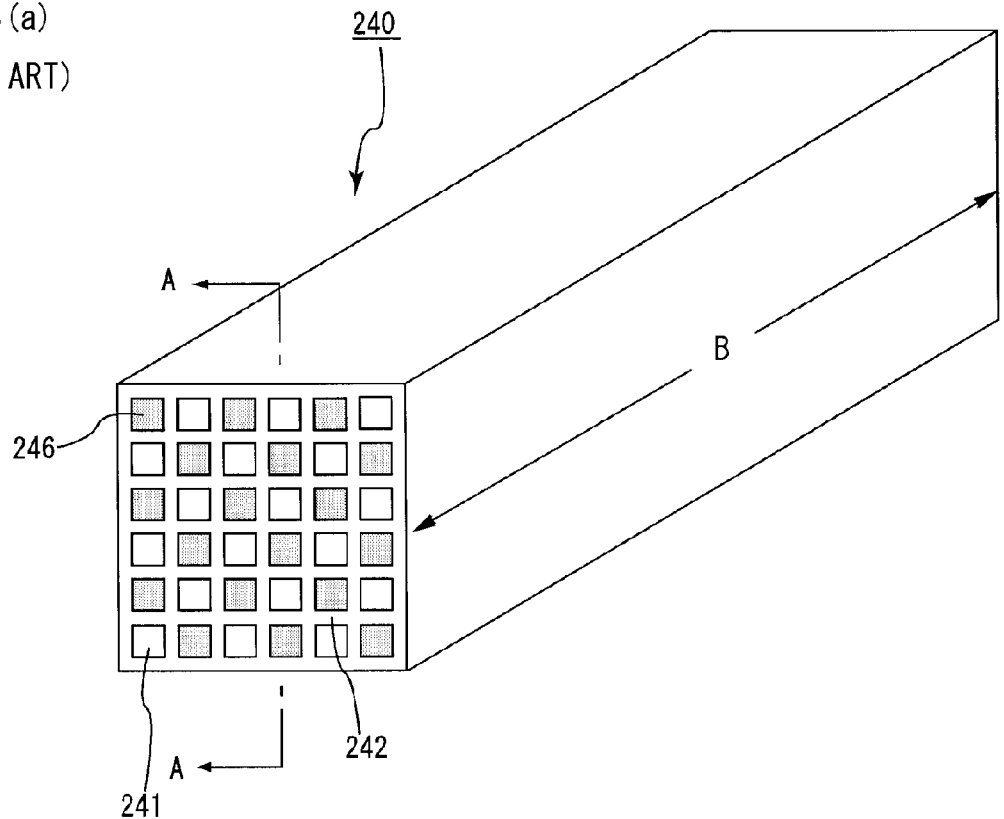
Figure 8B:
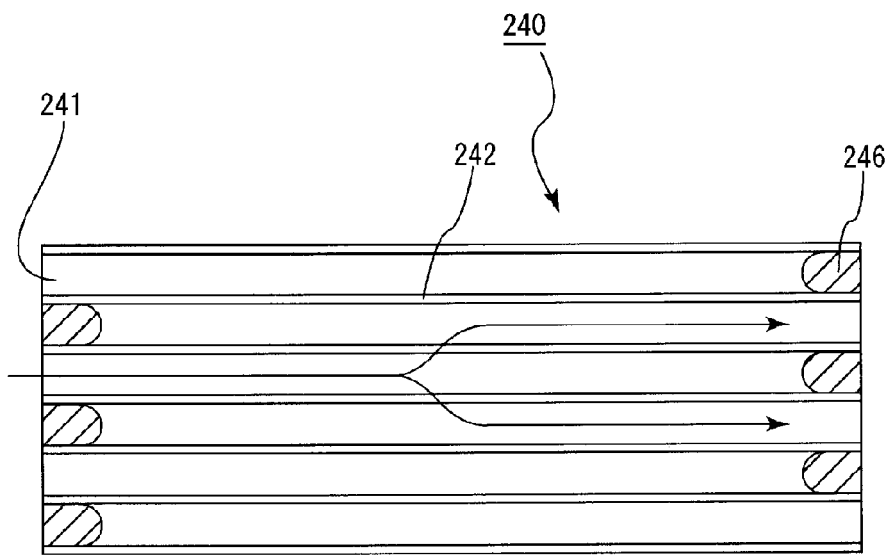

FIG. 8($a$) is a perspective view that schematically shows a honeycomb fired body forming the conventional honeycomb structure, and FIG. 8($b$) is an A-A line cross-sectional view of FIG. 8($a$).

Figure 9A:
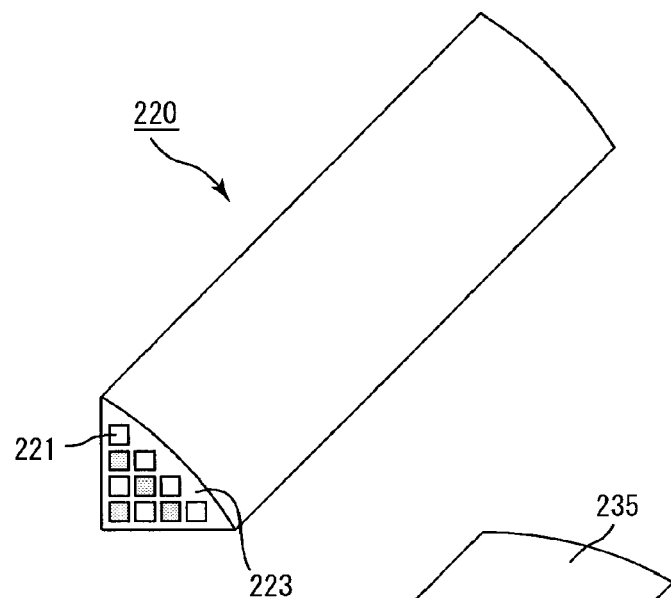
Figure 9B:
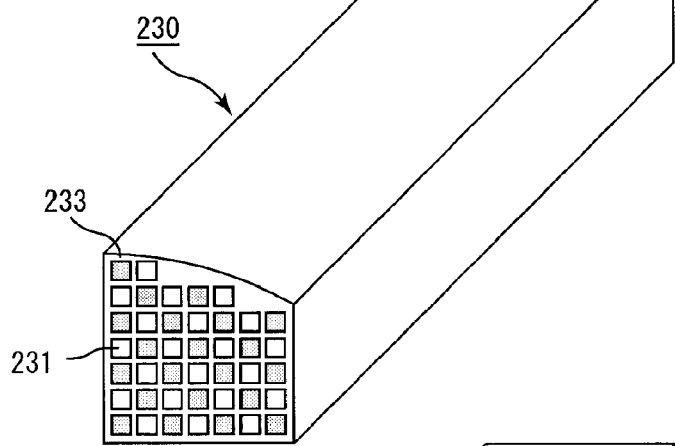
Figure 9C:
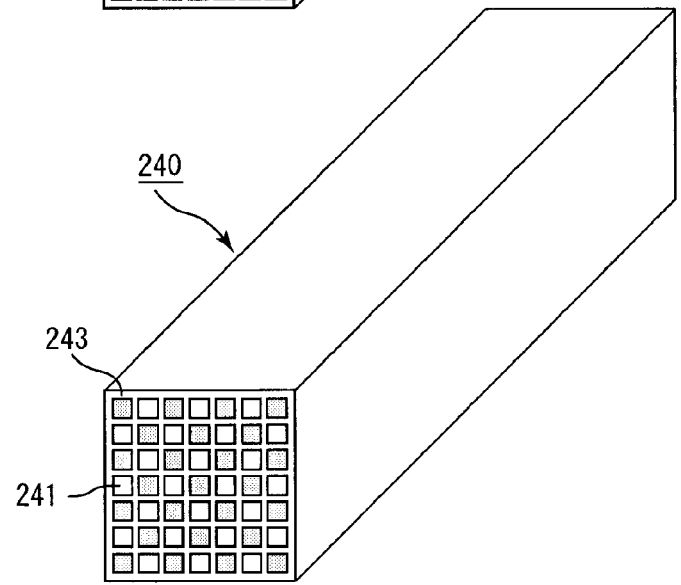

FIGS. 9(a) to 9(c) are perspective views that schematically show honeycomb fired bodies forming the conventional honeycomb structure.

Figure 10:
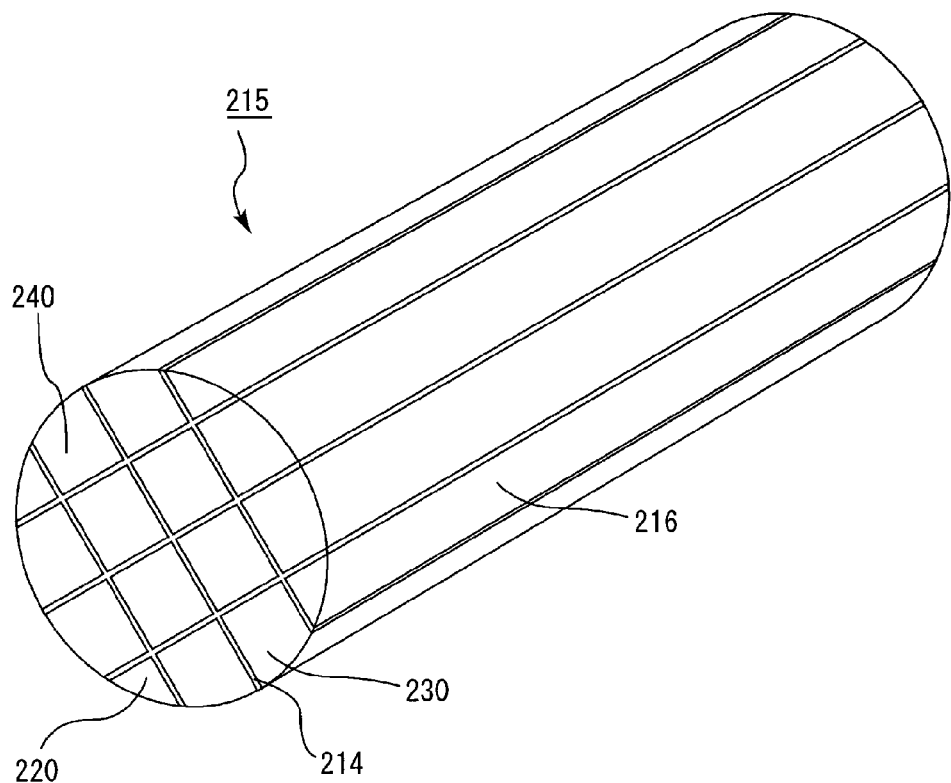

FIG. 10 is a perspective view that schematically shows a ceramic block formed by combining the honeycomb fired bodies shown in FIGS. 9(a) to 9(c) with one another.

DESCRIPTION OF THE EMBODIMENTS

The embodiments will now be described with reference to the accompanying drawings, wherein like reference numerals designate corresponding or identical elements throughout the various drawings.

The following description will discuss a honeycomb structure in accordance with embodiments of the present invention.

The honeycomb structure according to the embodiment of the present invention is a honeycomb structure, including a structure in which a plurality of pillar-shaped honeycomb fired bodies, each having a large number of cells longitudinally disposed in parallel with one another with a cell wall therebetween and an outer wall formed on the periphery of the number of cells, are combined with one another by interposing an adhesive layer, with a sealing material layer being formed on the peripheral face of the combined ceramic blocks, wherein out of the outer walls of the honeycomb fired bodies, an outer wall forming one portion of the peripheral face of the ceramic block has a protruding portion on a surface of the outer wall, and the protruding portion is made from the same material as the material of the outer walls.

The honeycomb structure according to the embodiment of the present invention has a structure in which honeycomb fired bodies, each having an outer wall on the periphery of cells, are combined with one another to form a ceramic block, and out of the outer walls, an outer wall forming one portion of the peripheral face of the ceramic block has a protruding portion on a surface of the outer wall, with a sealing material layer being formed on the periphery thereof.

It is conceivable that when the sealing material layer is formed in this manner, an anchoring effect is exerted between the sealing material layer and the ceramic block.

For this reason, in comparison with a honeycomb structure in which a sealing material layer is formed on the peripheral face of ceramic blocks with no protruding portions formed thereon as shown in FIG. 10, in the honeycomb structure of the present invention, the sealing material layer is less likely to be separated from the ceramic block, even after repeatedly having been used as a filter for purifying exhaust gases.

In the present specification, the word "pillar" in the phrase "pillar shape" refers to any desired shape of a pillar including a round pillar, an oval pillar, a polygonal pillar and the like.

Figure 1:
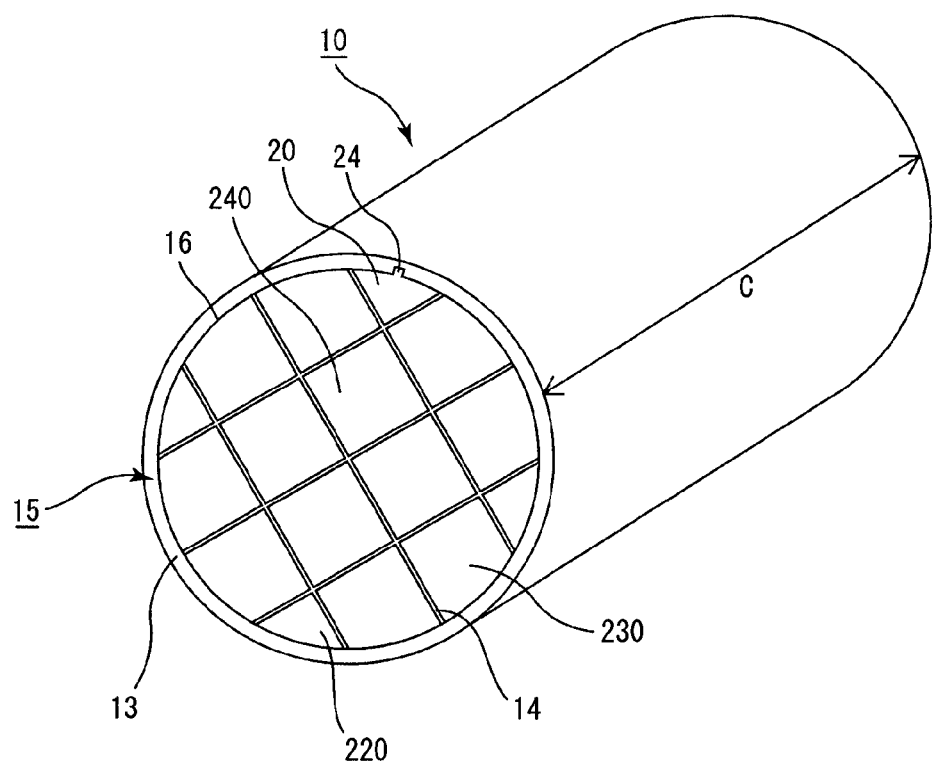
FIG. 1 is a perspective view that schematically shows one example of a honeycomb structure according to an embodiment of the present invention.

FIG. 1 is a perspective view that schematically shows one example of the honeycomb structure according to an embodiment of the present invention.

A honeycomb structure 10, shown in FIG. 1, which is made from silicon carbide ceramics or the like, has a structure in which: a single piece of a honeycomb fired body 20 (see FIG. 2), which is a honeycomb fired body whose cross-sectional shape perpendicular to the longitudinal direction (the direction shown by an arrow C in FIG. 1) is a shape surrounded by two straight lines and one curved line (hereinafter, referred to also as an A-type honeycomb fired body), with a protruding portion 24 being formed on the curved face forming the one curved line on the cross-sectional shape; three pieces of honeycomb fired bodies 220 (see FIG. 9(a)), which are A-type honeycomb fired bodies, with no protruding portion formed thereon; eight pieces of honeycomb fired bodies 230 (see FIG. 9(b)), each of which has a shape surrounded by three straight lines and a curved face 235 forming one curved line on its cross-sectional shape (hereinafter, referred to also as a B-type honeycomb fired body), with no protruding portion formed thereon; and four pieces of honeycomb fired bodies 240 (see FIG. 9(c)), each of which has a shape surrounded by four straight lines on its cross-sectional shape (hereinafter, referred to also as a C-type honeycomb fired body), with no protruding portion formed thereon, are combined with one another by interposing an adhesive layer 14 to form a ceramic block 15, and a sealing material layer 13 is formed on the peripheral face 16 of the ceramic block 15.

Moreover, each of the honeycomb fired bodies forming the honeycomb structure 10 according to the embodiment of the present invention has an outer wall on the periphery of a large number of cells. In the present invention, the outer wall refers to a cell wall that is disposed on the outermost periphery of the honeycomb fired body.

Here, the outer wall is not a cell wall that is exposed by a cutting operation or the like.

With reference to the drawings, the following description will discuss the honeycomb fired body 20 that is the A-type honeycomb fired body forming the honeycomb structure 10 according to the embodiment of the present invention, and has a protruding portion formed on the surface of its outer wall that forms one portion of the peripheral face 16 of the ceramic block 15.

Figure 2:
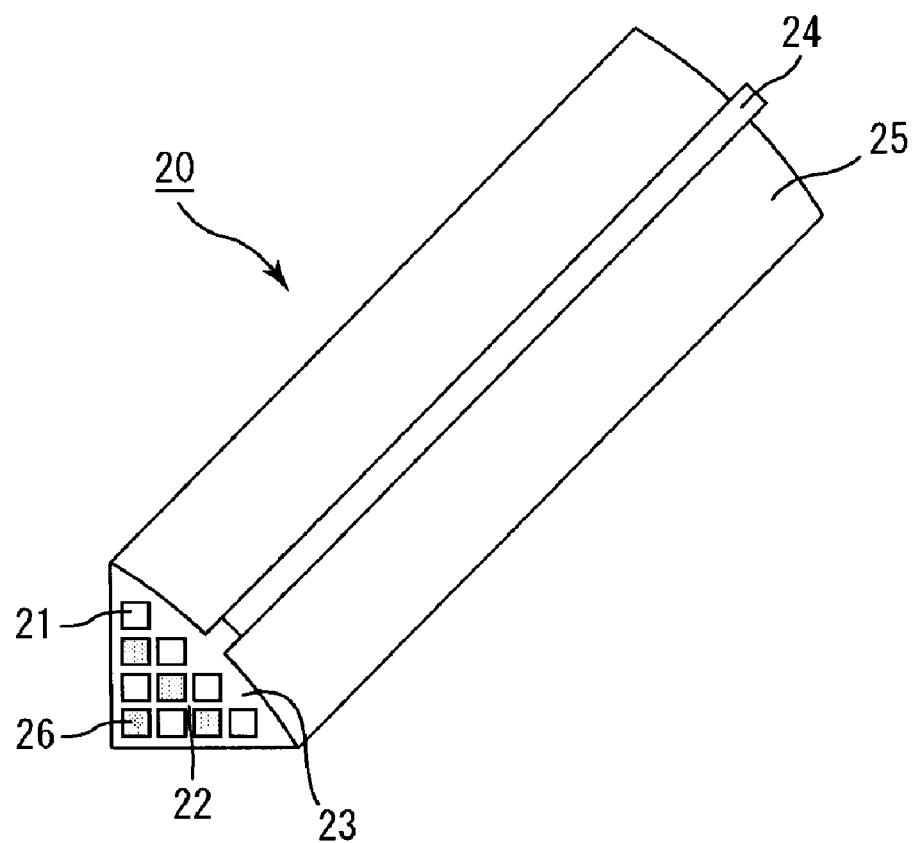
FIG. 2 is a perspective view that schematically shows one example of a honeycomb fired body having a protruding portion on the surface of an outer wall thereof, out of A-type honeycomb fired bodies forming the honeycomb structure according to an embodiment of the present invention.

FIG. 2 is a perspective view that schematically shows one example of the A-type honeycomb fired body having a protruding portion on the surface of its outer wall, out of those A-type honeycomb fired bodies forming the honeycomb structure according to the embodiment of the present invention.

In the honeycomb fired body 20, a large number of cells 21 are longitudinally disposed in parallel with one another with a cell wall 22 therebetween, an outer wall 23 is further disposed on the outside of the outermost cells 21, and either one of the ends of each of the cells 21 is sealed with a plug 26, so that the cell wall 22 is allowed to function as a filter. Therefore, exhaust gas that has entered one cell 21 is discharged from another cell 21 after having always passed through a cell wall 22 between the cells 21.

Moreover, on the surface of the outer wall 23, a protruding portion 24 made from the same material as the outer wall 23 is formed on a curved face 25 that is to form one portion of the peripheral face 16 of the ceramic block 15 upon forming the ceramic block 15. This protruding portion 24 is a portion protruding from the curved face 25, and in the honeycomb fired body 20, it is continuously formed in a direction parallel to the longitudinal direction of the honeycomb fired body.

Moreover, in the honeycomb fired body 20 shown in FIG. 2, the cell 21 has an approximately square shape in its cross section perpendicular to the longitudinal direction thereof, and the positions of the cells are designed so that the approximately square shapes having approximately the same dimension in the cross section thereof are disposed at the same intervals. Here, when the positions of these cells are designed, no cells are formed at a portion in the vicinity of the curved face 25 in which one portion of the cell having the shape is to be overlapped with the curved face 25.

In the honeycomb structure 10 according to the embodiment of the present invention shown in FIG. 1, a sealing material layer 13 is formed on the peripheral face 16 of the ceramic block 15 on which the protruding portion 24 is formed.

It is conceivable that when the sealing material layer 13 is formed in this manner, an anchoring effect is exerted between the sealing material layer 13 and the ceramic block 15. For this reason, the honeycomb structure 10 according to the embodiment of the present invention makes it possible to provide a honeycomb structure that is less susceptible to separation of the sealing material layer in comparison with a honeycomb structure in which a sealing material layer is formed on a peripheral face 216 of a ceramic block 215 as shown in FIG. 10, with no protruding portion being formed thereon.

Next, the following description will discuss another example of the embodiment of A-type honeycomb fired body on which a protruding portion is formed.

A honeycomb structure 120 shown in FIG. 3 has approximately the same outer shape as that of the honeycomb fired body 20 shown in FIG. 2, and a protruding portion 124 is also formed on an outer wall 123 in approximately the same manner as in the honeycomb fired body 20. In the honeycomb fired body 120, most of the cells 121 have an approximately square shape in the cross section perpendicular to the longitudinal direction thereof, and in the vicinity of the curved face 125, the cell having an approximately triangular shape on its cross-sectional shape is formed along the curved face 125. Either one of the ends of each of the cells 121 is sealed with a plug 126, so that the cell wall 122 is allowed to function as a filter. The honeycomb fired body 120 of this kind may also be used as the A-type honeycomb fired body forming the honeycomb structure of the present invention, in the same manner as in the honeycomb fired body 20.

Here, out of those honeycomb fired bodies forming the honeycomb structure according to the embodiment of the present invention, the shape of the honeycomb fired body having the protruding portion is not particularly limited to the shape of the A-type honeycomb fired body 20 or the A-type honeycomb fired body 120.

Figure 4A:
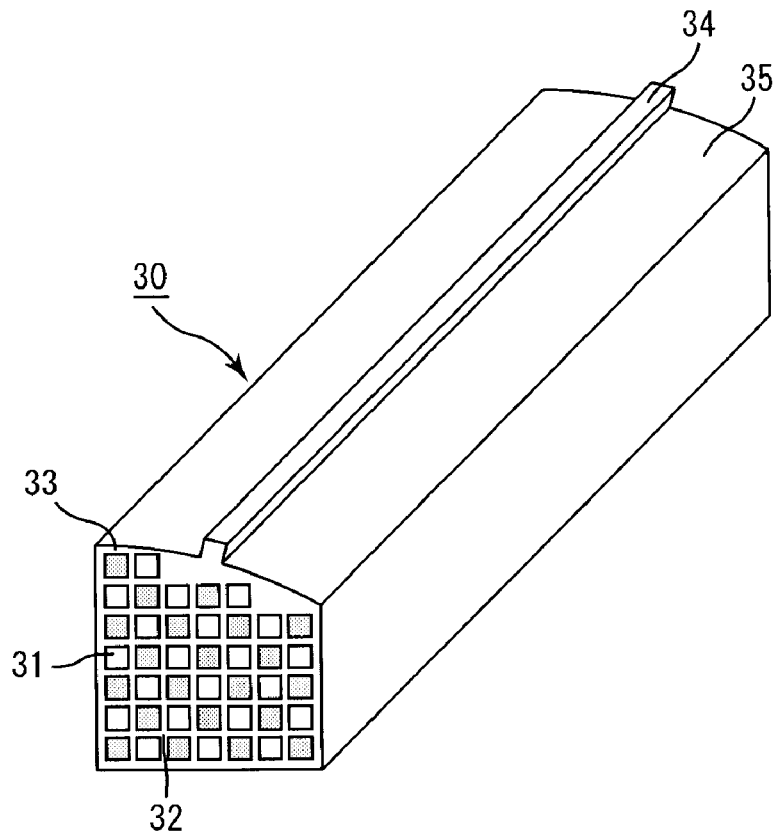
Figure 4B:
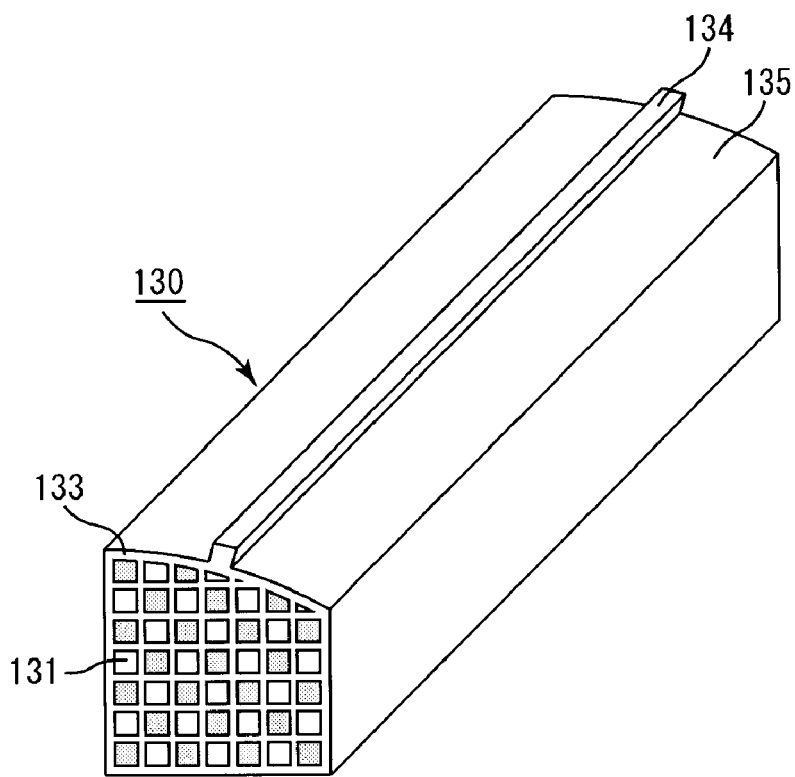

FIGS. 4(a) and 4(b) are perspective views that show one example of a B-type honeycomb fired body having a protruding portion on the surface of the outer wall, out of the B-type honeycomb fired bodies that may form the honeycomb structure according to the embodiment of the present invention.

In the B-type honeycomb fired body 30 shown in FIG. 4(a), a large number of cells 31 are disposed longitudinally in parallel with one another with a cell wall 32 therebetween, and an outer wall 33 is further formed on the outside of the outermost cell 31. Here, on the surface of the outer wall 33, a protruding portion 34 made from the same material as the outer wall 33 is formed on a curved face 35 that is to form one portion of the peripheral face 16 upon forming the ceramic block 15.

Moreover, in the B-type honeycomb fired body 30, the cell 31 has an approximately square shape in its cross section perpendicular to the longitudinal direction thereof, and the positions of the cells are designed so that the approximately square shapes having approximately the same dimension in the cross section thereof are disposed at the same intervals. Here, when the positions of these cells are designed, no cells are formed at a portion in the vicinity of the curved face 35 in which one portion of the cell having the shape is to be overlapped with the curved face 35.

A honeycomb fired body 130, shown in FIG. 4(b), shows another example of the B-type honeycomb fired body with a protruding portion formed thereon. A honeycomb structure 130 has approximately the same outer shape as that of the honeycomb fired body 30 shown in FIG. 4(a), and a protruding portion 134 is also formed on an outer wall 133 in approximately the same manner as in the honeycomb fired body 30. In the honeycomb fired body 130, most of the cells 131 have an approximately square shape in the cross section perpendicular to the longitudinal direction thereof, and in the vicinity of the curved face 135, the cell having an approximately trapezoidal shape or an approximately triangular shape on its cross-sectional shape is formed along the curved face 135.

The honeycomb fired body 130 of this kind may also be used as the B-type honeycomb fired body forming the honeycomb structure according to the embodiment of the present invention, in the same manner as in the honeycomb fired body 30.

In the honeycomb structure according to the embodiments of the present invention, the position at which the protruding portion is formed is not particularly limited as long as it is on the surface of the outer wall of the honeycomb fired body that forms one portion of the periphery of the ceramic block, protruding portions may be formed on the surfaces of the outer walls of both of the A-type honeycomb fired body and the B-type honeycomb fired body, or may be formed on only the surface of the outer wall of the A-type honeycomb fired body, or may be formed on only the surface of the outer wall of the B-type honeycomb fired body.

Moreover, as the A-type honeycomb fired body and the B-type honeycomb fired body, those having a protruding portion and those having no protruding portion may be present in a mixed manner in one honeycomb structure.

Furthermore, the position on which a protruding portion is formed in one honeycomb fired body is not particularly limited, and it may be set in the vicinity of the center portion of the surface of the outer wall, as shown in FIGS. 2, 3, 4(a), and 4(b), or may be set in the vicinity of the ends thereof (in the vicinity of the adhesive layer between the honeycomb fired body and an adjacent honeycomb fired body).

In the honeycomb structure according to the embodiments of the present invention, the number of protruding portions to be formed on a single piece of a honeycomb fired body forming the honeycomb structure is not particularly limited to one, and two or more protruding portions may be formed on a single piece of the honeycomb fired body. And the number of the protruding portions to be formed on a single piece of the honeycomb fired body is desirably smaller than the number of cell walls connected to the outer wall of the honeycomb fired bodies.

In the embodiments of the present invention, the number of the protruding portions is counted in the following manner: with respect to the protruding portion that is continuously extended in the longitudinal direction of the honeycomb fired body on the surface of the outer wall from one of the end faces of the honeycomb fired body to the other end face thereof, the protruding portion that is extended from one of the end faces to the other end face is counted as one portion, and even in the case where the protruding portion that is extended from one of the end faces to the other end face has disconnected shapes divided into a plurality of portions between the one of the end faces to the other end face, those disconnected protruding portions are added all together and counted as one portion.

FIG. 5 is a cross-sectional view obtained by cutting the A-type honeycomb fired body shown in FIG. 3 by a cross section perpendicular to the longitudinal direction thereof. With reference to this drawing, the following description will discuss the number of cell walls connected to the outer wall of a honeycomb fired body. Here, in FIG. 5, borders 129 disposed between the outer wall and the cells and between the outer wall and the cell walls are indicated by dotted lines so as to make the position of the outer wall clearer.

In the honeycomb fired body 120 shown in FIG. 5, four cell walls 122a are disposed in the lengthwise direction in such a manner so as to separate the respective cells 121, and four cell walls 122*b* are formed in the lateral direction. Here, the respective cell walls 122*a* and 122*b* are connected by borders 129 to the outer wall 123 having the protruding portion 124 thereon. Therefore, in FIG. 5, with respect to the number of cell walls connected on the borders 129 to the outer wall 123 having the protruding portion 123 thereon, there are four cell walls 122*a* extending in the lengthwise direction and four cell walls 122*b* extending in the lateral direction; thus, the total eight cell walls are connected. The number of the cell walls connected to the outer wall in this manner is defined as the number of cell walls connected to the outer wall having the protruding portion thereon.

In the honeycomb fired body 120 shown in FIG. 5, since only one protruding portion 124 is formed, the number of the protruding portion is smaller than the number of cell walls connected to the outer wall having the protruding portion thereon.

Moreover, in the honeycomb structure according to the embodiments of the present invention, out of the honeycomb fired bodies disposed on the outermost periphery of the ceramic block, each outer wall of four or more different honeycomb fired bodies desirably has the protruding portion on the surface of the each outer wall.

When the protruding portions are formed at four or more positions, it is possible to provide a honeycomb structure in which the sealing material layer is less likely to be separated from the ceramic block.

Moreover, in the honeycomb structure according to the embodiments of the present invention, out of the honeycomb structures disposed on the outermost periphery of the ceramic block, each of the outer wall of the honeycomb fired body (A-type honeycomb fired body) having a shape surrounded by two straight lines and one curved line on a cross-sectional shape of the honeycomb fired body formed upon being cut in a direction perpendicular to the longitudinal direction desirably has the protruding portion on the surface of the each outer wall.

Moreover, in the honeycomb structure according to the embodiments of the present invention, a shape of the protruding portion is not particularly limited, and examples thereof include an approximately rectangular parallelepiped shape having longer sides parallel to the longitudinal direction, an approximately semi-round pillar shape, an approximately triangular pillar shape, and the like.

The approximately rectangular parallelepiped shape is desirably used among these. This shape makes it possible to easily form the protruding portion, with an angle of an apex of the approximately rectangular shape, formed by cutting the approximately rectangular parallelepiped shape along a plane perpendicular to the longitudinal direction, being set within a desirable range; therefore, it becomes possible to further improve the effect of preventing the separation between the sealing material layer and the ceramic block. Moreover, both of a width and a height of the approximately rectangular shape formed by cutting the approximately rectangular parallelepiped shape along the plane perpendicular to the longitudinal direction are desirably about 0.5 to about 2 mm.

With reference to FIG. 5, the following description will discuss a method for determining a width and a height of the protruding portion formed on the surface of the outer wall of the honeycomb fired body.

As shown in FIG. 5, the shape obtained by cutting the protruding portion 124 along a plane perpendicular to the longitudinal direction corresponds to an approximately rectangular shape, and the width of the protruding portion corresponds to the width of the upper face of the approximately rectangular shape, and is indicated by a dimension W in FIG. 5, while the height of the protruding portion corresponds to the height from the upper face of the protruding portion 124 to the surface of the outer wall 123 and is indicated by a dimension H in FIG. 5.

Here, in the case where the dimensions from the upper face of the protruding portion 124 to the surface of the outer wall 123 are different between the two sides on the upper face of the approximately rectangular shape, the dimension on the longer side is defined as the height of the protruding portion.

When the width or the height of the approximately rectangular shape is less than about 0.5 mm, the effect of preventing the occurrence of separation between the sealing material layer and the ceramic block may be lowered. In contrast, in the case where the width exceeds about 2 mm, even when the width is further increased, the effect of preventing the separation is not further improved. Moreover, in the case where the height exceeds about 2 mm, the protruding portion sticks out of the surface of the sealing material layer, sometimes disturbing the installation of the honeycomb structure into an exhaust gas purifying device, with the result that the thickness of the sealing material layer needs to be increased so as to prevent the protruding portion from sticking out.

In the honeycomb structure according to the embodiments of the present invention, the proportion of the length of the longer side of the protruding portion to the length in the longitudinal direction of the honeycomb structure is desirably about 70 to about 100%. The length of the protruding portion of less than about 70% may reduce the effect of preventing the occurrence of separation between the sealing material layer and the ceramic block, and the length exceeding about 100% causes the protruding portion to stick out of the honeycomb structure to cause the protruding portion to be easily damaged.

Moreover, the surface of the protruding portion is desirably prepared as a roughened surface in comparison with the surface of the outer wall. Thus, the anchoring effect upon adhesion to the sealing material layer is improved, making it possible to provide a higher effect of preventing the occurrence of separation between the sealing material layer and the ceramic block.

In the honeycomb structure according to the embodiments of the present invention, the main component of constituent materials of the honeycomb fired body is not particularly limited, and examples thereof include: nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite and aluminum titanate; and the like.

Non-oxide ceramics are desirably used among these, and in particularly, silicon carbide is more desirably used. This material is superior in the heat-resistant property, mechanical strength, thermal conductivity, and the like. Here, a silicon-containing ceramic material prepared by blending metal silicon into the ceramic material and a ceramic material in which ceramic is bonded by silicon or a silicate compound may also be used, and a material prepared by blending metal silicon into silicon carbide (silicon-containing silicon carbide) is desirably used among these.

In particular, a silicon-containing silicon-carbide-based ceramic material containing about 60% by weight or more of silicon carbide is desirably used.

The porosity of the honeycomb fired body is not particularly limited, and desirably about 35 to about 60%. The porosity of about 35% or more does not tend to cause clogging in the honeycomb structure according to the embodiment of the present invention; in contrast, the porosity of about 60% or less does not tend to cause a reduction in the strength of the honeycomb fired body, unlikely resulting in damage therein.

The average pore diameter of the honeycomb fired body is desirably about 5 to about 30 µm. The average pore diameter of about 5 µm or more does not tend to cause clogging of particulates; in contrast, the average pore diameter of about 30 µm or less does not tend to allow particulates to easily pass through the pores, ensuring the capturing of the particulates in the honeycomb structure and its functioning as a filter.

Here, the porosity and the pore diameter can be measured through known methods such as a mercury porosimetry, Archimedes method and a measuring method using a scanning electronic microscope (SEM).

The particle size of the ceramic powder to be used upon manufacturing the honeycomb fired body is not particularly limited, the ceramic powder that tends not to cause the case where the size of the honeycomb structure manufactured by the following firing process becomes smaller than that of the honeycomb molded body after degreased is desirable, and for example, mixed powder prepared by combining 100 parts by weight of ceramic particles having an average particle size of about 1.0 to about 50 µm with about 5 to about 65 parts by weight of ceramic particles having an average particle size of about 0.1 to about 1.0 µm, is desirably used. By mixing the ceramic particles having the particle sizes at the blending ratio, it becomes possible to manufacture a honeycomb fired body having a porous property.

The thickness of the cell walls of the honeycomb structure according to the embodiments of the present invention is not particularly limited, and desirably about 0.20 to about 0.40 mm. The thickness of the cell wall of about 0.20 mm or more does not tend to become to thin to support the honeycomb structure, but likely sufficiently maintain the strength of the honeycomb structure; in contrast, the thickness of about 0.40 mm or less does not tend to cause an increase in the pressure loss.

The thickness of the outer wall of the honeycomb fired body forming the honeycomb structure according to the embodiments of the present invention is not particularly limited, and desirably about 0.20 to about 0.40 mm in the same manner as in the thickness of the cell walls. Moreover, it may be made thicker than the thickness of the cell walls. In the case where the thickness of the outer wall is made thicker than that of the cell walls, it becomes easy to increase the strength of the outer wall portion.

The plugs used for sealing the cells are desirably made from a porous ceramic material.

In the honeycomb structure according to the embodiments of the present invention, since the honeycomb fired body is made from porous ceramics, by preparing the plug made from the same porous ceramics as in the honeycomb fired body, the bonding strength between the honeycomb fired body and the plug may easily be increased. Moreover, by adjusting the porosity of the plug in the same manner as in the honeycomb fired body, the thermal expansion coefficient of the honeycomb fired body and the thermal expansion coefficient of the plug are properly coordinated with each other so that it becomes easy to prevent a gap from occurring between the plug and the cell wall due to a thermal stress upon manufacturing and in use, and also to prevent cracks from occurring in the plug and in the cell wall at portions in contact with the plug.

In the case where the plug is made from porous ceramics, the material thereof is not particularly limited, and examples thereof include the same material as the ceramic material forming the honeycomb fired body.

In the honeycomb structure according to the embodiments of the present invention, as shown in FIG. 1, the adhesive layer 14 is formed between the respective honeycomb fired bodies, and the sealing material layer 13 is formed on the peripheral face of the ceramic block 15. Moreover, by preliminarily forming the sealing material layer 13 as described above, the shape of the honeycomb structure can be adjusted and it becomes easy to prevent gases flowing through the cells from leaking.

The material forming the adhesive layer and the sealing material layer is not particularly limited, and examples thereof include an inorganic binder, an organic binder, inorganic fibers, inorganic particles, and a material made by combining these.

In the honeycomb structure according to the embodiments of the present invention, the adhesive layer and the sealing material layer may be made from the same material, or may be made from different materials. Moreover, in the case where the adhesive layer and the sealing material layer are made from the same material, the blending ratios of the material may be the same or different.

Examples of the inorganic binder include silica sol, alumina sol and the like. Each of these may be used alone or two or more kinds of these may be used in combination. Silica sol is more desirably used among the inorganic binders.

Examples of the organic binder include polyvinyl alcohol, methyl cellulose, ethyl cellulose, carboxymethyl cellulose, and the like. Each of these may be used alone or two or more kinds of these may be used in combination. Carboxymethyl cellulose is more desirably used among the organic binders.

Examples of the inorganic fibers include ceramic fibers and the like made from silica-alumina, mullite, alumina, silica or the like. Each of these may be used alone or two or more kinds of these may be used in combination. Silica-alumina fibers are more desirably used among the ceramic fibers.

Examples of the inorganic particles include carbides, nitrides, and the like, and specific examples thereof include inorganic powder, whiskers and the like made from silicon carbide, silicon nitride, boron nitride, and the like. Each of these may be used alone, or two or more kinds of these may be used in combination. Out of the inorganic particles, silicon carbide is desirable due to its superior thermal conductivity.

The adhesive layer and the sealing material layer may be made from a dense body or a porous body.

Moreover, the thickness of the sealing material layer is desirably about 0.5 to about 2.5 mm, and desirably made thicker than the height of the protruding portion. This structure is made because the protruding portion sticking out of the surface of the sealing material layer may intervene with installation of the honeycomb structure into an exhaust gas purifying device.

Moreover, a catalyst may be supported on the honeycomb structure according to the embodiments of the present invention.

In the honeycomb structure according to the embodiments of the present invention, by supporting thereon a catalyst that is capable of converting toxic gas components in exhaust gases such as CO, HC and $NO_x$, the toxic components in exhaust gases can be sufficiently converted through a catalytic reaction. Moreover, by further supporting a catalyst that accelerates burning of PMs, it becomes possible to burn and remove PMs more easily.

The following description will discuss an example of a method for manufacturing the honeycomb structure according to the embodiments of the present invention.

Here, for example, processes for manufacturing the honeycomb structure 10 shown in FIG. 1 will be described.

First, an extrusion-molding process by which a material composition containing ceramic powder and a binder is extrusion-molded and a firing process by which the molded body manufactured in the extrusion-molding process is fired are carried out.

Since the honeycomb structure 10 is configured by four kinds of honeycomb fired bodies, the four kinds of honeycomb fired bodies are manufactured in these processes.

First, the following description will discuss a sequence of processes used for manufacturing an A-type honeycomb fired body 20 having a protruding portion on the surface of the outer wall.

First, an extrusion-molding process is carried out in which a wet mixture prepared by adding water to the material composition containing ceramic powder and a binder is extrusion-molded.

The material composition to be used for the extrusion-molding is not particularly limited, and those material compositions that allow the honeycomb fired body after the manufacturing process to have a porosity of about 35 to about 60% are desirably used, and examples of the main component for constituent materials for the honeycomb fired body include a material composition, as described above, prepared by adding a binder and a dispersant solution to ceramic powder, and the like.

The binder is not particularly limited, and examples thereof include: methylcellulose, carboxy methylcellulose, hydroxy ethylcellulose, polyethylene glycol, and the like.

In general, the blending amount of the binder is desirably about 1 to about 10 parts by weight with respect to 100 parts by weight of the ceramic powder.

The dispersant solution is not particularly limited, and examples thereof include an organic solvent such as benzene, alcohol such as methanol, and water and the like.

An appropriate amount of the dispersant solution is blended so as to set the viscosity of the wet mixture in a predetermined range.

After these ceramic powder, binder and dispersant solution have been mixed by using an attritor or the like, the resulting mixture is sufficiently kneaded by using a kneader or the like, and then extrusion-molded so that a honeycomb molded body is manufactured.

Moreover, a molding auxiliary may be added to the material paste, if necessary.

The molding auxiliary is not particularly limited, and examples thereof include: ethylene glycol, dextrin, fatty acid soap, fatty acid, polyalcohol, and the like.

Furthermore, a pore-forming agent such as spherical acrylic particles and graphite may be added to the material composition, if necessary.

In the extrusion-molding process, the extrusion molding is carried out by using an extrusion-molding die that forms the cross-sectional shape of the extruded molded body into the same shape as the shape of the A-type honeycomb fired body 20; thus, a honeycomb molded body is manufactured.

Next, the honeycomb molded body is cut into a predetermined length, and dried by using a drying apparatus, such as a microwave drying apparatus, a hot air drying apparatus, a dielectric drying apparatus, a reduced pressure drying apparatus, a vacuum drying apparatus and a freeze drying apparatus, and a plug material paste, which forms plugs, is injected into predetermined cells so that a sealing process for sealing the cells is carried out.

The plug material paste is not particularly limited, and those plug material pastes that allow the plugs formed through post processes to have a porosity of about 35 to about 60% are desirably used. As the plug material paste, for example, the same material as that of the material composition may be used, and such a material prepared by adding a lubricant, a solvent, a dispersant and a binder to the ceramic powder used for the material composition is desirably used.

Next, the honeycomb molded body, on which the drying treatment and the sealing treatment have been carried out on demand, undergoes a degreasing process and a firing process under predetermined conditions so that it is possible to manufacture a honeycomb fired body having a plurality of cells longitudinally disposed in parallel with one another with a cell wall therebetween.

As the conditions and the like of the degreasing and firing processes of the honeycomb molded body, conventional conditions that have been used upon manufacturing a honeycomb fired body may be adopted.

The A-type honeycomb fired body 20 having a protruding portion on the surface of an outer wall can be manufactured through the processes.

Moreover, out of the honeycomb fired bodies forming the honeycomb structure 10, the A-type honeycomb fired body 220, the B-type honeycomb fired body 230 and the C-type honeycomb fired body 240, each of the three honeycomb fired bodies having no protruding portion on the peripheral face, are also manufactured through processes in which: a honeycomb molded body is formed by using an extrusion-molding die that forms a molded body that is extrusion-molded through the extrusion-molding process, and has approximately the same shape as the shape of the honeycomb fired body to be manufactured, and then undergoes the same drying treatment, sealing treatment, degreasing treatment and firing treatment as the treatments carried out in the processes for manufacturing the A-type honeycomb fired body 20.

Next, an adhesive paste is applied onto side faces of each honeycomb fired body to form an adhesive paste layer thereon, and the honeycomb fired bodies are successively combined with one another, or the respective honeycomb fired bodies are temporarily secured into a molding frame having approximately the same shape as the shape of a ceramic block to be manufactured, and an adhesive paste is injected into the gaps between the respective honeycomb fired bodies, so that a honeycomb aggregated body having a predetermined size is formed; thus, a binding process is carried out in which: this honeycomb aggregated body is heated so that the adhesive paste layers are dried and solidified to form a ceramic block 15 in which the honeycomb fired bodies are firmly bonded to each other by interposing the adhesive layers.

Then, a sealing material layer 13 is formed on the periphery of the ceramic block 15 by using the sealing material paste. At this time, the sealing material paste is desirably adhered thereto in such a manner so as to cover the protruding portion so that a sealing material layer having a thickness thicker than the height of the protruding portion is formed.

By the processes, a honeycomb structure 10 in which a plurality of the honeycomb fired bodies are combined with one another by interposing the sealing material layers 14, with a sealing material layer 13 being formed on the periphery thereof, can be manufactured.

Thereafter, if necessary, a catalyst is supported on the honeycomb structure. Here, the catalyst may be supported on the honeycomb fired bodies prior to manufacturing the aggregated body.

Upon supporting the catalyst, desirably, an alumina film having a high specific surface area is formed on the surface of a honeycomb structure, and a catalyst such as platinum is supported on this alumina film.

The honeycomb structure 10 according to the embodiments of the present invention can be manufactured through the above-described method for manufacturing the honeycomb structure.

Each of the cells installed in the honeycomb structure has either one of the ends thereof sealed, and the honeycomb structure with this kind of cells can be used as a honeycomb filter for use in purifying exhaust gases.

Moreover, the honeycomb structure according to the embodiments of the present invention may be prepared as a honeycomb structure in which the ends of each cell are not sealed with a plug, and this kind of the honeycomb structure of the present invention may be desirably used as a catalyst supporting carrier, and the same effects as those of a honeycomb filter according to the embodiments of the present invention can be obtained.

EXAMPLES

The following description will discuss the present invention in more detail by means of Examples; however, the present invention is not intended to be limited only by these Examples.

Example 1

(Manufacture of A-Type Honeycomb Fired Body Having Protruding Portion)

First, 52.2% by weight of coarse powder of silicon carbide having an average particle size of 22 μm and 22.4% by weight of fine powder of silicon carbide having an average particle size of 0.5 μm were wet-mixed. Then, with respect to the resulting mixture were added and kneaded 4.8% by weight of acrylic resin, 2.6% by weight of an organic binder (methylcellulose), 2.9% by weight of a lubricant (UNILUB, made by NOF Corp.), 1.3% by weight of glycerin and 13.8% by weight of water to prepare a mixed composition, and thereafter this was extrusion-molded so that a raw honeycomb molded body having approximately the same cross sectional shape as that of the A-type honeycomb fired body 20 shown in FIG. 2 was manufactured.

Here, a protruding portion was formed on this raw honeycomb molded body, and the shape of the protruding portion was an approximately rectangular parallelepiped shape with longer sides in parallel with the longitudinal direction of the honeycomb fired body, and the width W of the protruding portion was 0.5 mm and the height H thereof was 0.5 mm.

Next, the raw honeycomb molded body was cut so as to have a length of 150 mm in the longitudinal direction, and one portion of the protruding portion was sliced off by using a linear shape object so that the proportion of the length of the longer side of the protruding portion to the length of the honeycomb fired body in the longitudinal direction (hereinafter, referred to as the proportion of the length of the protruding portion to the length in the longitudinal direction) was set to 80%.

Next, the raw honeycomb molded body was dried by using a microwave drying apparatus so that a dried body of the honeycomb molded body was formed, and predetermined cells were filled with a paste having the same composition as the composition of the raw molded body, and this was again dried by using a drying apparatus.

The dried honeycomb molded body was degreased at 400° C., and fired at 2200° C. in a normal-pressure argon atmosphere for 3 hours so that a honeycomb fired body was manufactured.

The honeycomb fired body thus manufactured was an A-type honeycomb fired body with a protruding portion being formed at one portion on the surface of its outer wall, and its length in the longitudinal direction was 150 mm, with the proportion of the length of the protruding portion to the length in the longitudinal direction being set to 80%.

(Manufacture of Honeycomb Fired Body Without Protruding Portion)

Extrusion-molding processes were carried out by using the mixed composition so that honeycomb molded bodies respectively having the same shapes as the honeycomb fired body 230 and the honeycomb fired body 240 as shown in FIGS. 9(b) and 9(c) were formed, and these then underwent the same drying treatment, sealing treatment, degreasing treatment and firing treatment as the treatments carried out in the processes for manufacturing the honeycomb fired body so that a B-type honeycomb fired body 230 and a C-type honeycomb fired body 240, having no protruding portion thereon, were manufactured.

(Manufacture of Ceramic Block)

Next, by using a heat-resistant adhesive paste containing 30% by weight of alumina fibers having an average fiber length of 20 μm, 21% by weight of silicon carbide particles having an average particle size of 0.6 μm, 15% by weight of silica sol, 5.6% by weight of carboxy methylcellulose and 28.4% by weight of water, four pieces of A-type honeycomb fired bodies 20, eight pieces of B-type honeycomb fired bodies 230 and four pieces of C-type honeycomb fired bodies 240 were bonded to one another, and further dried at 120° C. so that a ceramic block in a round pillar shape having an adhesive layer of 1 mm in thickness, having protruding portions at four positions on the peripheral face, was manufactured.

Next, by using the same sealing material paste as the adhesive paste, a sealing material paste layer having a thickness of 2.5 mm was formed on the peripheral face 16 of the ceramic block 15. This sealing material paste layer was then dried at 120° C. so that a round pillar-shaped honeycomb structure having a size of 143.8 mm in diameter×150 mm in length was manufactured.

Examples 2 to 5

Honeycomb structures were manufactured in the same manner as in Example 1, except that the width W and the height H of the protruding portion and the proportions of the length of the protruding portion to the length in the longitudinal direction of the protruding portion were set as shown in Table 1.

Examples 6 to 8

Figure 6A:
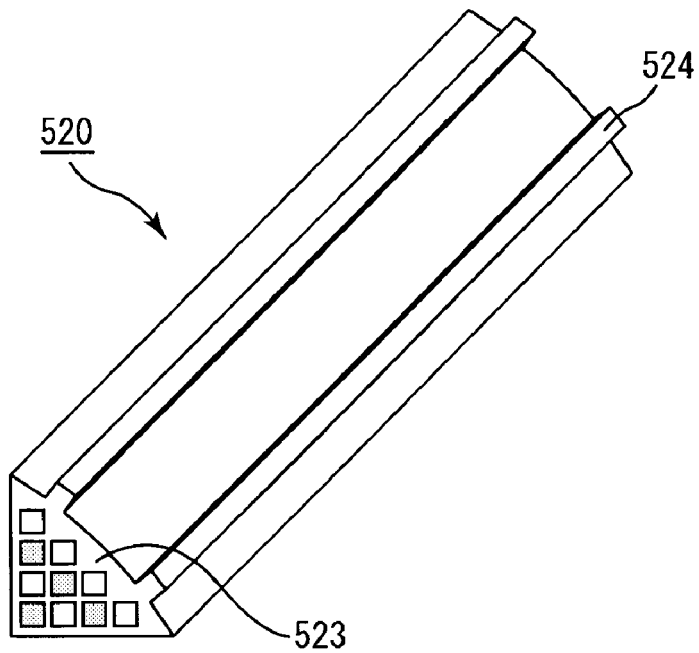
Figure 6B:
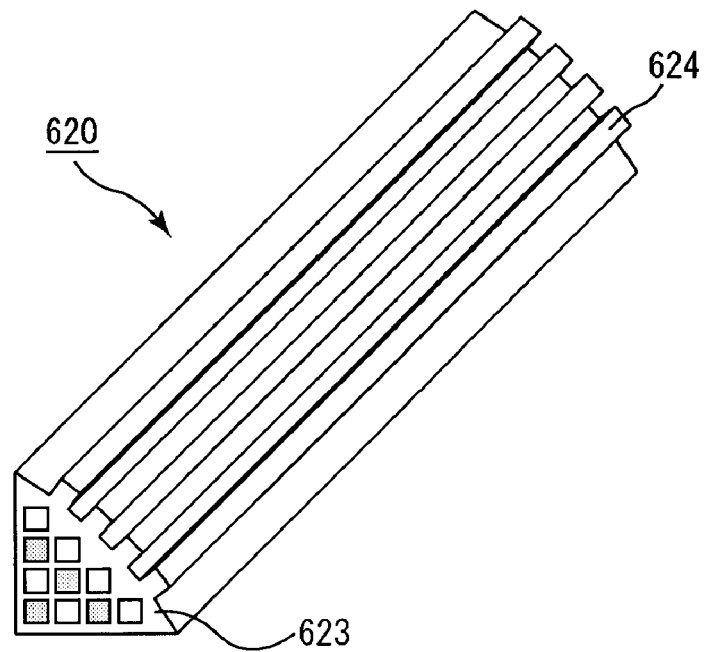

FIGS. 6(a) and 6(b) are perspective views that schematically show another example of the A-type honeycomb fired body having a protruding portion thereon.

The shape of the A-type honeycomb molded body to be molded in the extrusion-molding process was designed into a shape in which two protruding portions 524 were formed on the surface of the outer wall 523 as shown in FIG. 6(a), and the A-type honeycomb molded body was extrusion-molded to form a honeycomb molded body. After the extrusion molding process, an A-type honeycomb fired body 520 having protruding portions 524 formed at two positions was manufactured in the same manner as in Example 1.

A honeycomb structure having protruding portions formed at eight positions on the peripheral face of the ceramic block was manufactured in the same manner as in Example 1, except that four pieces of these A-type honeycomb fired bodies 520 were used.

Examples 9, 10

The shape of the B-type honeycomb molded body to be molded in the extrusion-molding process was designed into a shape having a protruding portion 34 on the surface of the outer wall 35 as shown in FIG. 4(a), and this was extrusion-molded to form a honeycomb molded body so that a B-type honeycomb fired body 30 with the protruding portion 34 formed thereon was manufactured by successively carrying out the same processes as in Example 1.

A honeycomb structure having protruding portions at twelve positions on the peripheral face of the ceramic block, was manufactured in the same manner as in Example 1, except that eight pieces of the B-type honeycomb fired bodies 30 were used.

Reference Example 1

The shape of the A-type honeycomb molded body to be molded in the extrusion-molding process was designed into a shape having four protruding portions 624 on the surface of the outer wall 623 as shown in FIG. 6(b), and this was extrusion-molded to form a honeycomb molded body so that an A-type honeycomb fired body with protruding portions 624 formed at four positions was manufactured by successively carrying out the same processes as in Example 1.

Moreover, a honeycomb molded body was manufactured by carrying out an extrusion-molding process by using a die having the same shape as the cross-sectional shape of the A-type honeycomb fired body 220 having no protruding portion thereon as shown in FIG. 9(a), and then an A-type honeycomb fired body 220 having no protruding portion formed thereon was manufactured in the same manner as in Example 1.

A honeycomb structure having protruding portions at four positions on the peripheral face of the ceramic block, was manufactured in the same manner as in Example 1, except that three pieces of these honeycomb fired bodies 220 having no protruding portion thereon and a single piece of honeycomb fired body 620 having protruding portions formed at four positions on the surface of the outer wall were used as the A-type honeycomb fired bodies.

Reference Example 2

A honeycomb structure having protruding portions at four positions on the peripheral face of the ceramic block was manufactured in the same manner as in Example 1, except that two pieces of the A-type honeycomb fired bodies 220 having no protruding portion thereon that are the same as those used in Reference Example 1 and that two pieces of the A-type honeycomb fired bodies 520 having protruding portions at two positions on the surface of the outer wall that are the same as those used in Example 6 were used as the A-type honeycomb fired bodies.

Reference Examples 3 to 6

Honeycomb structures were manufactured in the same manner as in Example 1 except that the width W and the height H of the protruding portion and the proportions of the length in the longitudinal direction were set as shown in Table 1.

Comparative Example 1

A honeycomb structure having no protruding portion on the peripheral face of a ceramic block was manufactured in the same manner as in Example 1, except that only four pieces of the A-type honeycomb fired bodies 220 having no protruding portions thereon were used as A-type honeycomb fired bodies.

(Evaluation on Easiness of Separation of Sealing Material Layer)

Each of the honeycomb structures manufactured as described above was evaluated for the easiness of separation of the sealing material layer.

As an apparatus for evaluating the separation-proneness, an apparatus, configured by a 2L common-rail-type diesel engine, exhaust-gas pipes that allow gases from the engine connected to the respective honeycomb filters to pass, and honeycomb filters having metal casings in which the respective honeycomb structures were housed, was used.

In this apparatus, the engine was driven at the number of revolutions of 2000 $min^{-1}$ and a torque of 47 Nm, and exhaust gases from the engine were allowed to flow through each of the honeycomb structures; thus, a regenerating treatment for the honeycomb structure was carried out by using a post-injection system for 10 minutes, for every driving operation corresponding to a travel distance of 500 km, and this was defined as one cycle.

After repeating this cycle 200 times and 400 times, the state of separation between the sealing material layer and the peripheral face of the ceramic block was visually observed. Table 1 shows the results thereof.

As a result of the visual observation, when a separation or a gap was observed between the sealing material layer and the peripheral face of the ceramic block, this state was denoted as "−" and when none of these defects were observed, this state was denoted as "+".

Here, in Table 1, with respect to the respective Examples, Reference Examples and Comparative Examples, the number of honeycomb fired bodies having the protruding portions is indicated as "the number of fired bodies having protruding portions", and the number of protruding portions formed in a single piece of the honeycomb structure is indicated as "the number of protruding portions."

Moreover, the size of the protruding portion and the proportion of the length of the protruding portion to the length in the longitudinal direction are collectively shown therein.

TABLE 1

| | Protruding portion | | | Proportion (%) of length of the protruding portion to the length in the longitudinal | State of separation of sealing material layer | | |
|---|---|---|---|---|---|---|---|
| | Number of fired bodies having protruding portions | Number of protruding portions | Size (mm) (W × H) (mm) | | 200 times | 400 times | Note |
| Example 1 | 4 | 4 | 0.5 × 0.5 | 80 | + | + | |
| Example 2 | 4 | 4 | 0.5 × 1.0 | 80 | + | + | |
| Example 3 | 4 | 4 | 0.5 × 2.0 | 80 | + | + | |
| Example 4 | 4 | 4 | 0.5 × 1.0 | 70 | + | + | |
| Example 5 | 4 | 4 | 1.0 × 1.0 | 90 | + | + | |
| Example 6 | 4 | 8 | 0.5 × 2.0 | 80 | + | + | |
| Example 7 | 4 | 8 | 0.5 × 1.0 | 100 | + | + | |
| Example 8 | 4 | 8 | 1.0 × 2.0 | 80 | + | + | |
| Example 9 | 12 | 12 | 0.5 × 0.5 | 70 | + | + | |
| Example 10 | 12 | 12 | 0.5 × 1.0 | 80 | + | + | |
| Reference Example 1 | 1 | 4 | 0.5 × 0.5 | 80 | + | − | |
| Reference Example 2 | 2 | 2 | 0.5 × 2.0 | 80 | + | − | |
| Reference Example 3 | 4 | 4 | 1.0 × 0.2 | 70 | + | − | |
| Reference Example 4 | 4 | 4 | 0.2 × 1.0 | 70 | + | − | |
| Reference Example 5 | 4 | 4 | 0.5 × 3.0 | 70 | + | + | * |
| Reference Example 6 | 4 | 4 | 0.5 × 0.5 | 60 | + | − | |
| Comparative Example 1 | 0 | 0 | NA | NA | − | − | |

NA = Not Available;
* with protruding portions sticking out of the sealing material layer As clearly indicated by Table 1, in the honeycomb structures in accordance with the respective Examples and Reference Examples, no defects were observed between the sealing material layer and the peripheral face of the ceramic block even after repeated tests of 200 times, and the results revealed that the sealing material layer and the ceramic block were less likely to be separated from each other. In contrast, in the honeycomb structure in accordance with Comparative Example, a separation occurred between the sealing material layer and the ceramic block after the repeated tests of 200 times.

Moreover, in the case where the width and the height of the protruding portion were about 0.5 mm or more, when the proportion of the length of the protruding portion was about 70% or more, and when four or more protruding portions were formed on four different honeycomb fired bodies, defects such as a separation were not observed between the sealing material layer and the peripheral face of the ceramic block, even after the repeated tests of 400 times; thus, the results revealed that the sealing material layer and the ceramic block were less likely to be separated from each other.

Furthermore, in the case where the height of the protruding portion was 3.0 mm as shown by the honeycomb structure of Reference Example 5, since the protruding portion stack out of the surface of the sealing material layer, a mat disposed inside the metal casing was scraped off by the protruding portion upon installation into an exhaust gas purifying device, with the result that it was difficult to install the resulting honeycomb structure into the exhaust gas purifying device.

For this reason, it was necessary to make the thickness of the sealing material layer thicker.

Numerous modifications and variations of the present invention are possible in light of the above teachings. It is therefore to be understood that within the scope of the appended claims, the invention may be practiced otherwise than as specifically described herein.

The invention claimed is:

1. A honeycomb structure comprising:
a plurality of pillar-shaped honeycomb fired bodies, each having a number of cells longitudinally disposed in parallel with one another with a cell wall therebetween;
an adhesive layer interposed between adjacent honeycomb fired bodies of said plurality of honeycomb fired bodies to combine said plurality of honeycomb fired bodies together; and
a sealing material layer formed on an outer peripheral face of said combined plurality of honeycomb fired bodies, said sealing material layer being formed by using a sealing material paste,
wherein at least two honeycomb fired bodies of said plurality of honeycomb fired bodies have a curved outer wall that forms a portion of said outer peripheral face of said combined plurality of honeycomb fired bodies,
wherein at least one of said outer walls has a protruding portion extending outwardly from a surface thereof in a direction away from a center of said honeycomb structure,
wherein said protruding portion is made from a same material as a material of said at least one outer wall,
wherein a shape of said protruding portion is an approximately rectangular parallelepiped shape that extends parallel to a longitudinal direction of a respective honeycomb fired body thereof, and
wherein both of a width and a height of a cross-sectional shape of said protruding portion, taken along a plane perpendicular to the longitudinal direction, are about 0.5 to about 2 mm.

2. A honeycomb structure comprising:
- a plurality of pillar-shaped honeycomb fired bodies, each having a number of cells longitudinally disposed in parallel with one another with a cell wall therebetween;
- an adhesive layer interposed between adjacent honeycomb fired bodies of said plurality of honeycomb fired bodies to combine said plurality of honeycomb fired bodies together; and
- a sealing material layer formed on an outer peripheral face of said combined plurality of honeycomb fired bodies, said sealing material layer being formed by using a sealing material paste,
- wherein at least two honeycomb fired bodies of said plurality of honeycomb fired bodies have an outer wall that forms a portion of said outer peripheral face of said combined plurality of honeycomb fired bodies,
- wherein at least one of said outer walls has a protruding portion extending outwardly from a surface thereof in a direction away from a center of said honeycomb structure,
- wherein said protruding portion is made from a same material as a material of said at least one outer wall,
- wherein said at least one outer wall has one or more protruding portions formed thereon,
- wherein a number of said protruding portions formed on said at least one outer wall is smaller than a number of cell walls connected to said at least one outer wall of a corresponding honeycomb fired body,
- wherein a shape of said protruding portion is an approximately rectangular parallelepiped shape that extends parallel to a longitudinal direction of a respective honeycomb fired body thereof, and
- wherein both of a width and a height of a cross-sectional shape of said protruding portion, taken along a plane perpendicular to the longitudinal direction, are about 0.5 to about 2 mm.

3. The honeycomb structure according to claim 1, wherein, out of a total number of said honeycomb fired bodies having outer walls that form a portion of said outer peripheral face of said combined plurality of honeycomb fired bodies, four or more of said total number each have a protruding portion extending from a surface of a respective outer wall thereof.

4. The honeycomb structure according to claim 1, wherein, out of all of said honeycomb fired bodies having outer walls that form a portion of said outer peripheral face of said combined plurality of honeycomb fired bodies, each outer wall of said honeycomb fired bodies having a cross-sectional shape, taken along a plane perpendicular to a longitudinal direction thereof, that is defined by two straight lines and one curved line has a protruding portion extending from a surface thereof.

5. The honeycomb structure according to claim 1, wherein, out of all of said honeycomb fired bodies having outer walls that form a portion of said outer peripheral face of said combined plurality of honeycomb fired bodies, each outer wall of said honeycomb fired bodies having a cross-sectional shape, taken along a plane perpendicular to a longitudinal direction thereof, that is defined by three straight lines and one curved line has a protruding portion extending from a surface thereof.

6. The honeycomb structure according to claim 1, wherein a proportion of a longitudinal length of said protruding portion to a longitudinal length of said respective honeycomb structure thereof is about 70 to about 100%.

7. The honeycomb structure according to claim 6, wherein said protruding portion continuously extends on said surface of said at least one outer wall from one end face of said respective honeycomb fired body to another end face of said respective honeycomb fired body in the longitudinal direction.

8. The honeycomb structure according to claim 6, wherein said protruding portion comprises a plurality of portions disconnected between one end face of said respective honeycomb fired body and another end face of said respective honeycomb fired body in the longitudinal direction.

9. The honeycomb structure according to claim 1, wherein said protruding portion is provided in a center portion of said surface of said at least one outer wall of a respective honeycomb fired body thereof.

10. The honeycomb structure according to claim 1, wherein said protruding portion has a roughened surface in comparison with said surface of said at least one outer wall.

11. The honeycomb structure according to claim 1, wherein each of said cells has an approximately square shape with a substantially common dimension, wherein said cells are positioned with a substantially common interval therebetween in a cross section perpendicular to a longitudinal direction of said cells, and wherein a location of said cells is limited to a place in which the approximately square shape does not overlap with a position of said outer wall of a respective honeycomb fired body.

12. The honeycomb structure according to claim 1, wherein each of said cells has one of an approximately triangular shape and an approximately square shape in a cross section perpendicular to a longitudinal direction of said cells, wherein said cells having the approximately triangular shape are provided along said outer wall of a respective honeycomb fired body, and wherein said cells having an approximately square shape are provided inward of said cells having the approximately triangular shape toward a center of said combined plurality of honeycomb fired bodies.

13. The honeycomb structure according to claim 1, wherein each of said cells has one of an approximately triangular shape, an approximately square shape and an approximately trapezoidal shape in a cross section perpendicular to a longitudinal direction of said cells, wherein said cells having one of the approximately triangular and the approximately trapezoidal shape are provided along said outer wall of a respective honeycomb fired body, and wherein said cells having the approximately square shape are provided inward of said cells having one of the approximately triangular shape and the approximately trapezoidal shape toward a center of said combined plurality of honeycomb fired bodies.

14. The honeycomb structure according to claim 1, wherein a thickness of at least one of said cell wall and said outer wall is from about 0.20 to about 0.40 mm.

15. The honeycomb structure according to claim 1, wherein a thickness of said outer wall is thicker than a thickness of said cell wall.

16. The honeycomb structure according to claim 1, wherein a thickness of said sealing material layer is from about 0.5 to about 2.5 mm and is larger than a thickness of said protruding portion.

17. The honeycomb structure according to claim 1, wherein each of said cells has either one end or another end thereof that is sealed.

18. The honeycomb structure according to claim 1, wherein both ends of said cells are not sealed.

19. The honeycomb structure according to claim 1, wherein said honeycomb structure is configured as a honeycomb filter for use in purifying exhaust gases.

20. The honeycomb structure according to claim 1, wherein said honeycomb structure is configured as a catalyst supporting carrier.

* * * * *

UNITED STATES PATENT AND TRADEMARK OFFICE
CERTIFICATE OF CORRECTION

PATENT NO. : 8,172,921 B2
APPLICATION NO. : 11/954840
DATED : May 8, 2012
INVENTOR(S) : Kazushige Ohno, Masafumi Kunieda and Shigeharu Ishikawa It is certified that error appears in the above-identified patent and that said Letters Patent is hereby corrected as shown below:

On the Title page, the INID (30) should read as follows:

Item (30)  Foreign Application Priority Data
   Feb. 28, 2007  (WO) ......................... PCT/JP2007/053770

Signed and Sealed this
Fourth Day of September, 2012

David J. Kappos
*Director of the United States Patent and Trademark Office*